F. J. ARGAST.
RAKE.
APPLICATION FILED SEPT. 17, 1910.
1,113,084.
Patented Oct. 6, 1914.
3 SHEETS—SHEET 1.
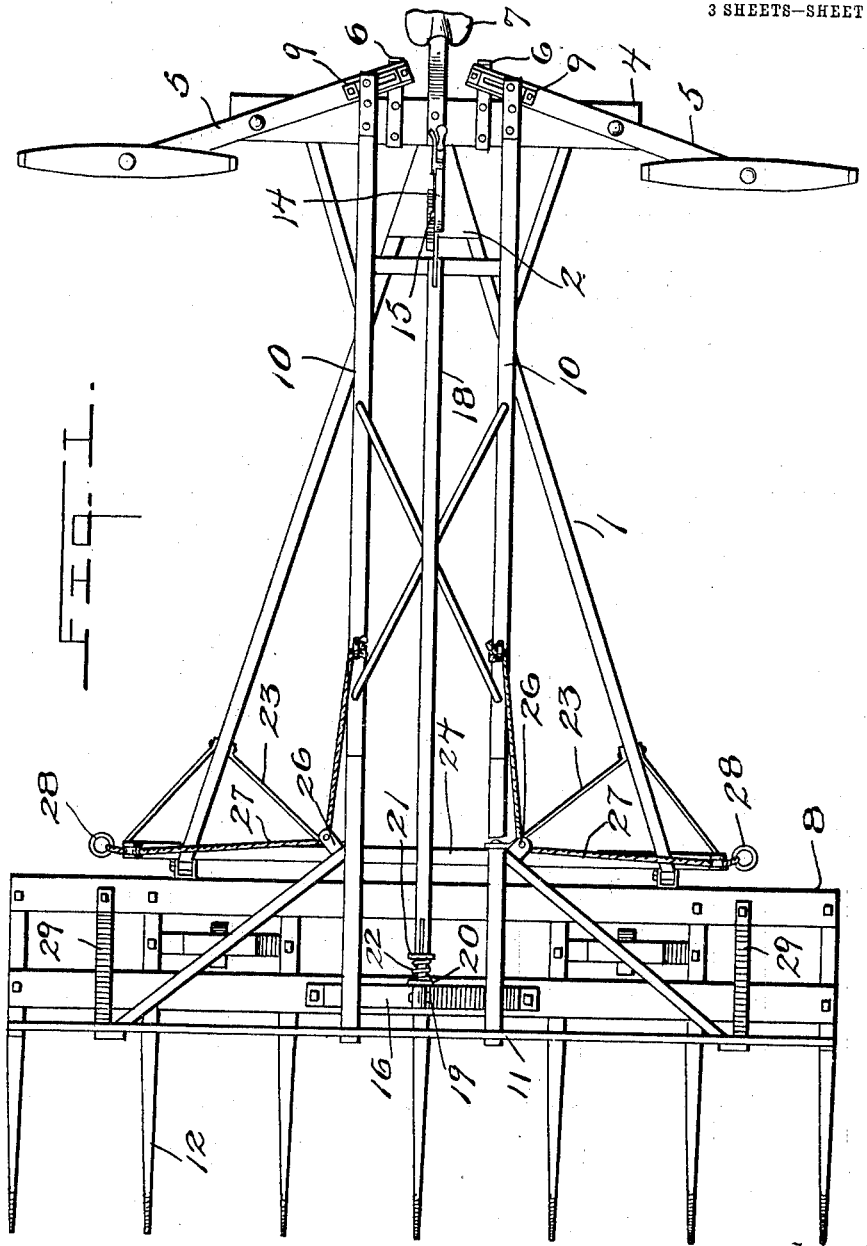
Witnesses
C. E. Johansen
M. L. Low
Inventor
F. J. Argast.
By Woodward & Chandlee
Attorneys

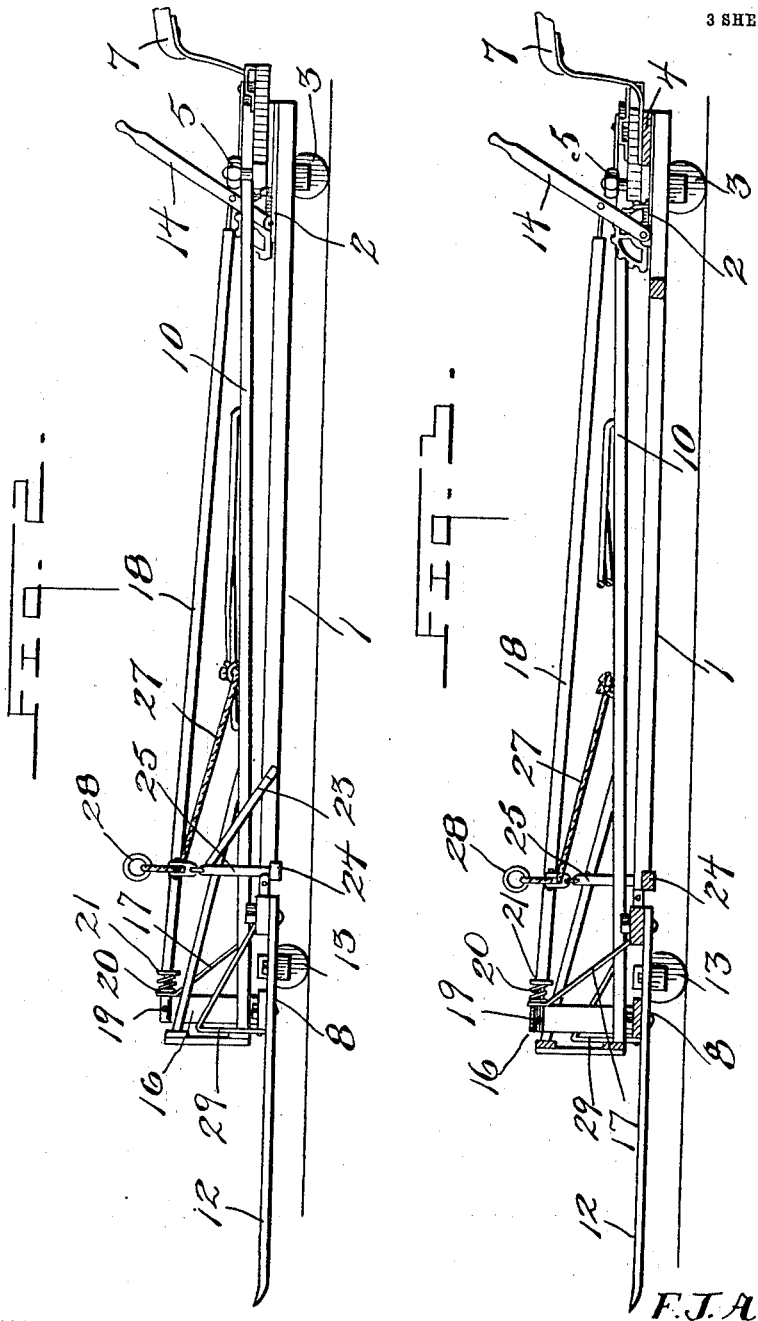

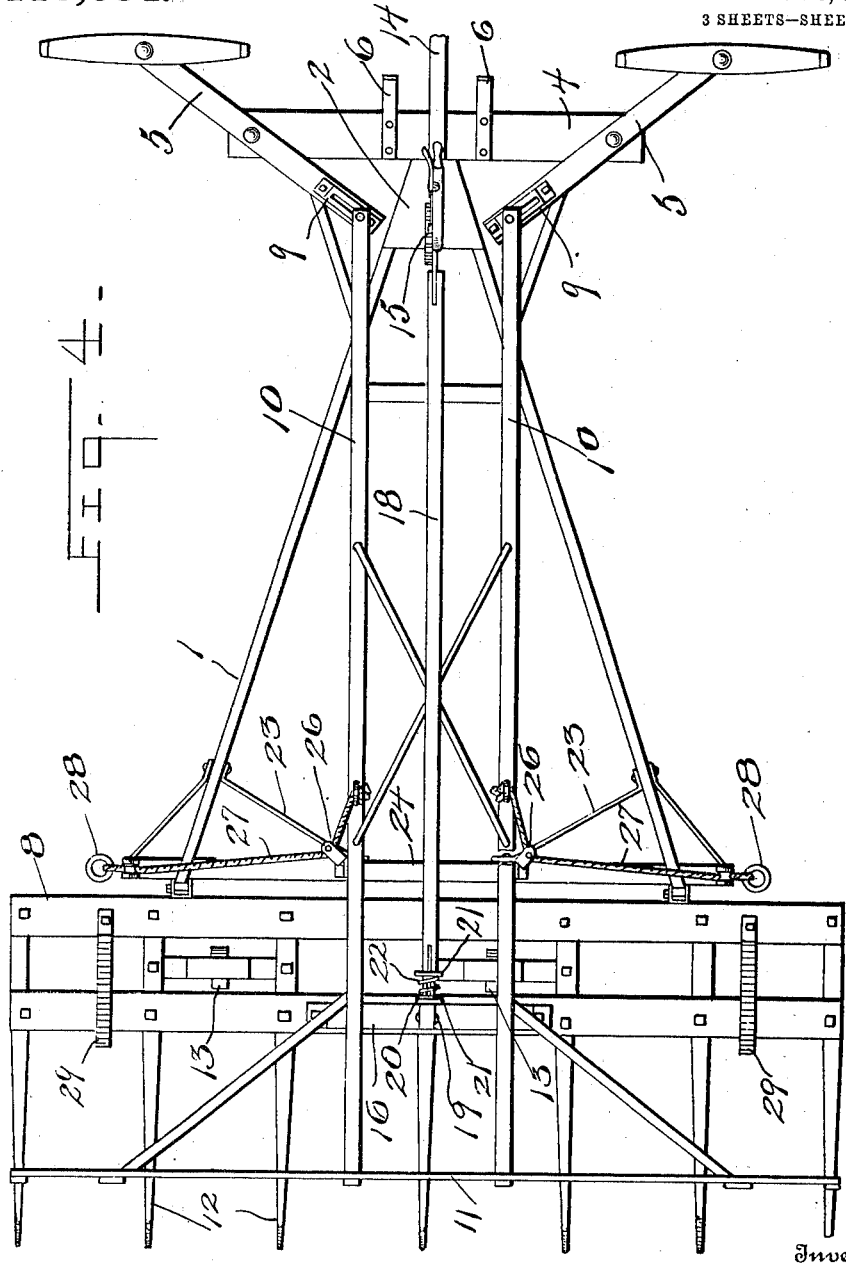

UNITED STATES PATENT OFFICE.

FRED J. ARGAST, OF MOFFIT, NORTH DAKOTA.

RAKE.

1,113,084.     Specification of Letters Patent.     Patented Oct. 6, 1914.

Application filed September 17, 1910. Serial No. 582,488.

*To all whom it may concern:*

Be it known that I, FRED J. ARGAST, a citizen of the United States, residing at Moffit, in the county of Burleigh and State of North Dakota, have invented certain new and useful Improvements in Rakes, of which the following is a specification.

This invention relates to certain new and useful improvements in rakes, and more particularly to those constructed in such a manner as to be forced forwardly by the animals hitched to the machine, said machine being at all times under perfect control of the operator.

Briefly stated the invention consists of a suitable frame properly arranged with teeth projecting therefrom in advance of the horses or other animals attached to the machine, and a slidable frame carried by the machine thus constructed and adapted for coöperation with the projecting teeth, whereby the hay or other material collected is conveniently carried and practically deposited.

With these and other objects in view, the present invention consists in the combination and arrangement of parts which will be hereinafter more fully described and particularly pointed out in the appended claim, it being understood that changes in the specific structure shown and described may be made within the scope of the claim without departing from the spirit of the invention.

In the drawings: Figure 1 is a top plan view of the complete invention. Fig. 2 is a side elevation of the same. Fig. 3 is a longitudinal sectional view through the device. Fig. 4 is a top plan view of the device showing the same in its shifted position.

Referring to the drawings 1 represents a V-shaped frame of suitable length, the ends of which are connected by a plate 2 in which is mounted a trailer 3, adjacent to the connecting ends of said frame. Rigidly secured to the connecting ends of said frame above the upper surface of the connecting plate 2 is a beam 4 to which is pivotally attached the swingletrees 5 as clearly shown in Fig. 1 of the drawings. The beam 4 is provided with angular stops 6 for limiting the movement of the swingletrees 5, and located between said swingletrees is a seat 7 for the driver which is properly arranged to face the feeding end of the machine.

The forward expanded ends of the V-shaped frame 1 are hingedly connected to the connecting movable member 8 of the rake, the construction of which frame will be hereinafter more specifically described.

Secured to the inner ends of the swingletrees 5 are slotted plates 9 with which the free ends of the parallel bars 10 coöperate, whereby the latter are moved simultaneously and collectively by the movement of said swingletrees, thereby operating the forward end of the transverse portion of the rake which coöperates with the forwardly projecting teeth of the machine.

Fixed to the forward ends of the connecting bars 10 are spaced horizontally disposed members 11 which are slidably located upon the upper surfaces of the teeth 12, said members when moved in a forward direction serving to dislodge the hay collected by the teeth 12.

As before stated the rearwardly projecting teeth 12 are of a sufficient length and properly spaced for all practical purposes for which the machine is designed, the length of said teeth depending principally upon the distance corresponding to the movement of the slidable frame operated by the swingletrees in a manner hereinafter described.

The hinged frame having the forwardly collecting teeth is provided with wheels 13 upon which the machine is properly guided and directed in its travel, the rear trailer 3 assisting in carrying out this particular function of the machine.

As before stated the toothed frame which is hingedly connected to the V-shaped portion of the machine is constructed and adapted for vertical movement to and from the slidable member of the rake and is capable of operation in a manner now to be described.

Movably secured to the rear end of the connecting plate 2 is the lower end of a lever 14 carrying a suitable spring actuated pawl 15 which is constructed for coöperation with a suitable segmental rack secured to said connecting plate, whereby the main frame of the machine having the teeth projecting therefrom is adjustable vertically in respect to the sliding clearing member of the machine as will be hereinafter clearly set forth.

To the hinged member of the machine is rigidly secured a yoke 16 which rests upon the parallel bars 10 and is supported by a brace 17 leading from the upper end of said yoke and secured to the adjacent member or bar forming a part of said forked member. The yoke 16 is adjustably and yieldingly secured to the hand operated lever in a manner as clearly shown in the drawings, the end of said connecting bar 18 being centrally disposed between the connecting bars 10, and having a plate forming one end of the same and properly slotted for coöperation with a pin 19 carried by the yoke 16 whereby said plate is slidably located within the yoke. The slotted plate 20 is of sufficient length and surrounding the same and disposed between suitable washers 21 is a coil spring 22 which is capable of compensating for any and all inaccuracies in the proper manipulation of the machine. The coil spring 22 also permits the hinged frame of the machine to be operated or moved independently of its connecting and operating rod and parts coöperating therewith, the parts being so arranged and collectively connected as to perform the practical lowering and elevating of the hinged member of the machine when occasion requires, said hinged member being hingedly adjustable in respect to the longitudinally sliding member 8 of the rake.

The parallel connecting bars 10 are properly held in their relative position with the remaining part of the machine by braces 23 secured to the connecting transverse beam 24 located adjacent to the hinged connecting members of the machine.

Secured to the opposite projecting ends of the connecting beam 24 are two uprights 25, and movably fixed to the latter and also to the upper ends of the braces 23 are pulleys 26 through which a rope or other flexible connection 27 passes, the latter having one end attached to the bar 10 and their opposite free ends provided with a ring 28 for convenient and practical attachment to the collar forming a part of the harness of the horse properly attached to the machine.

Secured to the hingedly connecting frame in rear of the slidable member 8 thereof are two angular stops 29 adapted for contact with the movable upper portion of the rake, whereby the latter is limited in its movement in one direction or from the points of the rake carrying member of the machine.

In carrying out the invention and performing the practical operation of the same the horses or other animals are attached in the usual manner to the swingletrees 5 on either side of the V-shaped frame 1 the heads of the animals being directed forward of the machine and with the rings 28 attached to one end of the ropes properly secured to the collar or other equivalent portion of the harness.

From the foregoing description it is perfectly evident that the ordinary draft upon the machine by the animals attached thereto will hold the slidable member of the rake at a remote distance from the collecting points of the machine in a forward movement of the latter, whereby the hay or other grain to be collected is properly deposited upon the hinged portion of the machine in advance of the movable member thereof and in such a position as to be susceptible of subsequent removal by the reverse direction of the horses or animals attached to the machine, whereby when a backward draft is applied to the rings 28 and ropes 27 to which the latter are attached a longitudinal movement is imparted to the upper movable portion of the machine thus causing the said movable portion to be directed toward the ends of the rake for depositing and automatically delivering the hay or other grain thus collected at a suitable and desired location.

When the various connecting parts of the machine are in their normal position and draft is not applied upon the rings 28 the movable member of the said machine will be in contact with the angular braces 9 leaving the outwardly projecting teeth of the hinged member of the machine in a suitable position for collecting the hay or other grain in advance of the longitudinally movable portion of the machine, whereby said grain or hay is properly carried to a suitable place for deposit in which instance the horses or animals attached to the machine are backed in the usual manner to impart a pull or draft upon the ropes 27 in which operation the movable member of the machine located above the receiving teeth will be operated or moved forwardly thereby causing said hay to be removed from the machine and properly deposited.

As clearly shown in the drawings the movable and operative portion of the machine or that actuated by the horses or other animal power is located in such a position as to be in sliding connection with the teeth of the rake and beyond the supporting frame thereof, and further the toothed portion of the rake is hingedly adjustable to and from the slidable portion of the rake by the lever 14 capable of ready access from the seat of the driver.

What is claimed is:

A rake comprising a suitable frame, a toothed member hingedly connected to the same, means for raising or lowering said member, a longitudinally sliding member located above said hinged member and adapted to be moved to and from the receiving projecting ends of the teeth of the hinged member, means for limiting the movement of said last named member in respect to the rear of the frame, swingle trees movably secured to the rear end of said frame and at the sides thereof, slotted plates secured adjacent the ends of the trees, bars having their rear ends slidably connected to the slots of the plates and their forward ends to the longitudinally operated member of the device, and means connecting said bars adapted for attachment to the harness of the horses, whereby the longitudinally arranged member is operated independently of the toothed member of the device.

In testimony whereof I affix my signature, in the presence of two witnesses.

FRED J. ARGAST.

Witnesses:
WILLIAM C. BENZ,
ANDREW TAYLOR.

Copies of this patent may be obtained for five cents each, by addressing the "Commissioner of Patents, Washington, D. C."